(12) United States Patent
Hung

(10) Patent No.: US 11,571,280 B2
(45) Date of Patent: Feb. 7, 2023

(54) ORTHODONTIC BRACKET

(71) Applicant: Cheng-Hsiang Hung, New Taipei (TW)

(72) Inventor: Cheng-Hsiang Hung, New Taipei (TW)

( * ) Notice: Subject to any disclaimer, the term of this patent is extended or adjusted under 35 U.S.C. 154(b) by 193 days.

(21) Appl. No.: 16/932,641

(22) Filed: Jul. 17, 2020

(65) Prior Publication Data

US 2021/0015587 A1    Jan. 21, 2021

Related U.S. Application Data

(60) Provisional application No. 62/876,127, filed on Jul. 19, 2019.

(51) Int. Cl.
*A61C 7/28*    (2006.01)

(52) U.S. Cl.
CPC .................................. *A61C 7/285* (2013.01)

(58) Field of Classification Search
CPC .............. A61C 7/285; A61C 7/14; A61C 7/28
See application file for complete search history.

(56) References Cited

U.S. PATENT DOCUMENTS

| | | | | |
|---|---|---|---|---|
| 3,748,740 A * | 7/1973 | Wildman | ............... | A61C 7/285 433/11 |
| 4,698,017 A * | 10/1987 | Hanson | .................. | A61C 7/145 433/11 |
| 5,562,444 A | 10/1996 | Heiser et al. | | |
| 7,025,591 B1 * | 4/2006 | Kesling | .................. | A61C 7/285 433/10 |
| 7,674,110 B2 * | 3/2010 | Oda | ........................ | A61C 7/285 433/10 |
| 7,695,277 B1 | 4/2010 | Stevens | | |
| 7,967,603 B2 * | 6/2011 | Heiser | ..................... | A61C 7/285 433/10 |
| 2002/0034715 A1 * | 3/2002 | Hanson | .................. | A61C 7/285 433/17 |
| 2003/0049582 A1 * | 3/2003 | Abels | ....................... | A61C 7/28 433/11 |

(Continued)

FOREIGN PATENT DOCUMENTS

| | | |
|---|---|---|
| CA | 2402337 A1 | 9/2001 |
| CN | 102772254 A | 11/2012 |

(Continued)

OTHER PUBLICATIONS

European Patent Office, Search Report, Application No. 20186322.2, dated Oct. 29, 2020, Germany.

(Continued)

*Primary Examiner* — Ralph A Lewis

(57) ABSTRACT

An orthodontic bracket is provided, including a main body, a cover, and an elastic spring element. The main body has an archwire slot configured to receive an archwire. The cover is hingedly connected to the main body, and the cover can be moved between an open position and a closed position. The open position exposes the archwire slot and the closed position covers the archwire slot. The elastic spring element is disposed in the main body, coupled to the cover and the main body, and configured to generate a force that moves the cover into the open position.

16 Claims, 11 Drawing Sheets

(56) References Cited

U.S. PATENT DOCUMENTS

| | | | |
|---|---|---|---|
| 2005/0019719 A1* | 1/2005 | Hanson | A61C 7/285 433/10 |
| 2005/0186525 A1* | 8/2005 | Abels | A61C 7/285 433/10 |
| 2008/0241782 A1* | 10/2008 | Abels | A61C 7/285 433/10 |
| 2012/0064476 A1* | 3/2012 | Sabilla | A61C 7/285 433/11 |
| 2015/0351873 A1 | 12/2015 | Sabilla | |
| 2018/0092716 A1* | 4/2018 | Koo | A61C 7/30 |
| 2021/0015587 A1* | 1/2021 | Hung | A61C 7/34 |

FOREIGN PATENT DOCUMENTS

| | | |
|---|---|---|
| CN | 203252752 U | 10/2013 |
| CN | 103584923 A | 2/2014 |
| CN | 210521127 U | 5/2020 |
| CN | 112315600 A | 2/2021 |
| DE | 4407100 A1 | 9/1995 |
| EP | 2428179 A1 | 3/2012 |
| EP | 2730250 A1 | 5/2014 |
| EP | 3284436 A1 | 2/2018 |
| JP | 6105103 B2 | 3/2017 |
| KR | 10-1538007 B1 | 7/2015 |
| TW | 201914543 A | 4/2019 |

OTHER PUBLICATIONS

Korean Patent Office, Office Action, Patent Application Serial No. 10-2020-0089061, dated Nov. 29, 2021, Korea.

* cited by examiner

ORTHODONTIC BRACKET

CROSS REFERENCE TO RELATED APPLICATIONS

This application claims the benefit of U.S. Provisional Application No. 62/876,127, filed on Jul. 19, 2019, the entirety of which is incorporated by reference herein.

BACKGROUND OF THE INVENTION

Field of the Invention

The application relates in general to an orthodontic bracket for dental use, and in particular to an orthodontic bracket with a hinged cover.

Description of the Related Art

Misaligned teeth can adversely affect a person's dental aesthetics, function, and health. The goal of orthodontic correction is to bring the teeth into proper alignment by using appliances which exert mechanical forces to move the teeth into the correct positions or orientations where the dental functions and aesthetics are improved.

Conventional braces use archwires and brackets to induce corrective forces on the teeth. The archwire is pre-shaped and interconnects the teeth through brackets that are affixed to the surfaces of the teeth. When initially installed, the archwire elastically deforms to accommodate the misaligned teeth. The archwire is resilient and exerts forces on the teeth through the brackets to bring the teeth into alignment with the pre-shaped form of the archwire. The archwire exerts continuous forces on the teeth to urge them to their finish positions. Traditional wires are fixed to the brackets using ligatures and strong forces are transmitted to the teeth. With self-ligating brackets, archwires can slide more freely in the archwire slot, achieving orthodontic tooth movement with less pressure and discomfort to the patient.

Prior art self-ligating brackets consist of a main bracket body attached to a base. An archwire slot extends mesial-distally across the main bracket body and between the gingival and occlusal tie wings. The archwire slot opens edgewise in the opposite direction to the base to receive an archwire. The bracket further consists of a locking cover which allows placement and removal of an archwire in the open position and slides or swings to lock in place to maintain the archwire in the archwire slot in the closed position. Prior art discloses various locking covers designed to achieve the same purpose.

Installation of the archwire with the self-ligating brackets requires specialized tools designed to manipulate the opening and closing of the locking covers. Usually, the placement and removal of an archwire is performed by a person (e.g. a dentist) other than the patient who would not be able to perform the task alone. Such manipulations can be difficult, especially in the case of lingual brackets. The structure of the locking covers introduces additional edges and protrusions to the bracket body which causes more discomfort to the patient.

In prior art U.S. Pat. No. 7,674,110, Oda disclosed a self-ligating bracket with a hinged cover that is movable in a non-collinear direction relative to the axis of rotation. Portions of the hinge pin flex to permit the cover to be locked with the bracket body and to be unlocked to release the cover from the closed position. The hinge hole provides enough space to allow the flexed pin portions to move within. In another prior art U.S. Pat. No. 7,695,277, Stevens disclosed a self-ligating bracket with a hinged cover with a hinge pin that can move vertically or laterally within a void space in the bracket body. The hinge pin moves to allow the hinged cover to be shifted to latch in place. This allows a rigid cover to deflect enough to latch to the locking part of a rigid base. In either case, no spring element as a discrete component is used to enable the latching mechanism. However, both the flexible pin and the hinge hole space alone can cause the cover to be unstable, especially in the open position, and there are no features for preventing the cover from inadvertent closure and opening too wide. This is a cause for concern due to unpredictable operator action that may break off the cover. Further, both designs have multiple protrusions and uneven surfaces that contribute to patient discomfort. It is desirable to provide a new bracket with several improvements over the prior art. It is an important issue to provide a better orthodontic bracket for dental use.

BRIEF SUMMARY OF INVENTION

To address the deficiencies of conventional products, an embodiment of the invention provides an orthodontic bracket, including a main body, a cover, and an elastic spring element. The main body has an archwire slot configured to receive an archwire. The cover is hingedly connected to the main body, and the cover is movable between an open position for exposing the archwire slot and a closed position for covering the archwire slot. The elastic spring element is disposed in the main body, coupled to the cover and the main body, and configured to generate a force to drive movement of the cover to the open position.

In some embodiments, the main body has a hole, and the cover has a hinge pin confined within the hole, wherein the hole is configured to allow translational movement of the hinge pin along a long axis of the hole, and allow rotation of the hinge pin about a pin axis of the hinge pin.

In some embodiments, when the cover moves from the closed position to the open position, the hinge pin moves from a first end of the hole to a second end of the hole which is farther way from the archwire slot than the first end.

In some embodiments, the cover further has a protrusion, and the main body further has a recessed slot, wherein when the cover is in the closed position, the protrusion engages with the recessed slot, and the elastic spring element stores an elastic potential energy.

In some embodiments, the cover is at a disengaged position when the protrusion is disengaged from the recessed slot. When the hinge pin is moved along the long axis of the hole from the first end toward the second end of the hole and the protrusion is disengaged from the recessed slot, the elastic potential energy of the elastic spring element is released to generate the force to rotate the cover from the disengaged position to the open position.

In some embodiments, the elastic spring element is a plate spring disposed between the hinge pin and the cover.

In some embodiments, the elastic spring element is a torsion spring which is wrapped around the hinge pin.

In some embodiments, the cover has a connecting portion connected to the hinge pin, and the hole is covered by the connecting portion when the cover is in the closed position.

In some embodiments, the archwire slot has a side wall and a redirecting wall which are connected to each other, and the redirecting wall is inclined to the side wall and to the long axis of the hole.

In some embodiments, the redirecting wall is inclined to the long axis of the hole.

In some embodiments, the redirecting wall guides the archwire to move from a first exit direction to a second exit direction, wherein the first exit direction is not parallel to the second exit direction.

In some embodiments, the archwire slot has a side wall and a redirecting wall, wherein the side wall is connected to the redirecting wall, and the redirecting wall is inclined to the side wall. The side wall guides the archwire to move in a first exit direction, and the redirecting wall guides the archwire to move from the first exit direction to a second exit direction, wherein the first exit direction is not parallel to the second exit direction.

In some embodiments, the cover has a cover wall having a curved portion, and the cover wall closes the archwire slot when the cover is in the closed position. When the cover is in the closed position, the curved portion guides the archwire to move in a guiding direction toward the redirecting wall, and the archwire is blocked by the redirecting wall and the cover wall.

In some embodiments, the cover wall further has a flat portion connected to the curved portion, and when the curved portion guides the archwire to move in the guiding direction, the archwire is blocked by the redirecting wall and the flat portion of the cover wall.

In some embodiments, when the cover is in the closed position and a pushing force of the archwire is directed against the redirecting wall and the cover wall, the pushing force directed against the cover wall pushes the protrusion against a wall of the recessed slot.

An embodiment of the invention provides an orthodontic bracket, including a main body and a cover. The main body has an archwire slot configured to receive an archwire. The cover is hingedly connected to the main body, wherein the cover has a hinge pin confined within a hole of the main body, and the hole is configured to allow translational movement of the hinge pin along a movement direction and allow rotation of the hinge pin about a pin axis of the hinge pin. The archwire slot has a side wall extending in a first exit direction and a redirecting wall inclined to the first exit direction. The redirecting wall is configured to redirect a force from the archwire in a second exit direction different from the first exit direction, so that the cover will not move in the first exit direction due to the movement of the archwire within the archwire slot.

In some embodiments, the redirecting wall has a curved structure.

In some embodiments, the main body further has a recessed slot, and the cover further has a protrusion that can be engaged with the recessed slot, wherein the translational movement of the hinge pin along the movement direction enables the engagement and disengagement of the protrusion with the recessed slot.

In some embodiments, the archwire slot extends in an extending direction which is perpendicular to the first exit direction and the second exit direction.

In some embodiments, the main body has a rear portion, and when the cover is in the open position, the rear portion restricts the cover from rotating excessively.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the orthodontic brackets are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
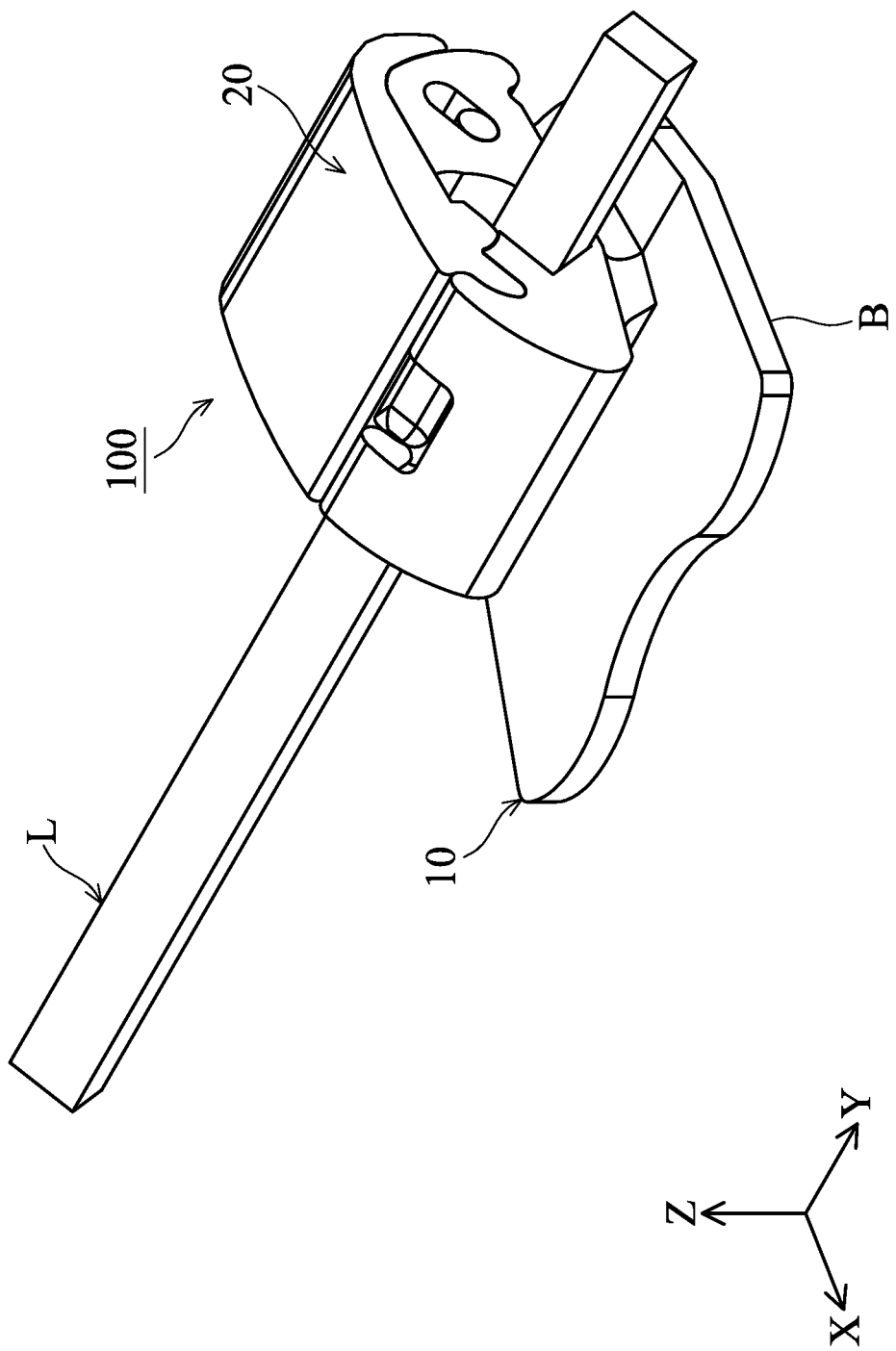
FIG. 1 is a schematic diagram of an orthodontic bracket for dental use according to an embodiment of the present invention.

Referring to FIG. 1, which is a schematic view showing the orthodontic bracket 100 for dental use. The orthodontic bracket 100 can be mounted, for example, on the inner or outer side surface of the upper or lower teeth of a patient. An archwire L extending in an extending direction DL is configured to be disposed in an archwire slot P of the orthodontic bracket 100, which induces corrective forces on the teeth. In some embodiments, an orthodontic bracket 100 is bonded to the lingual surface of a tooth (for example, an upper canine tooth) using a bonding adhesive. The structure of the orthodontic bracket 100 will be explained in detail below.

Figure 2:
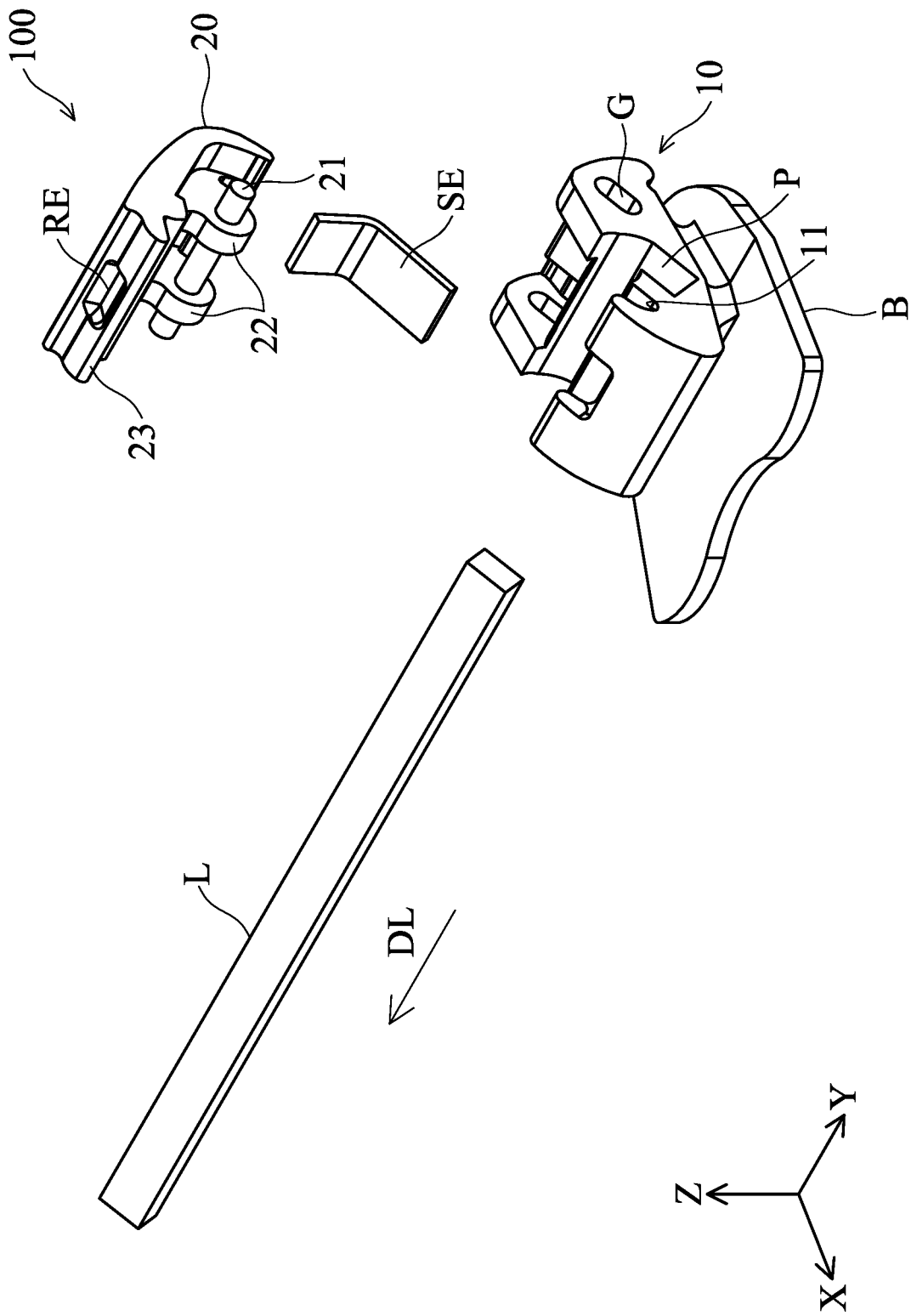
FIG. 2 is an exploded view of the orthodontic bracket in FIG. 1.
Figure 5:
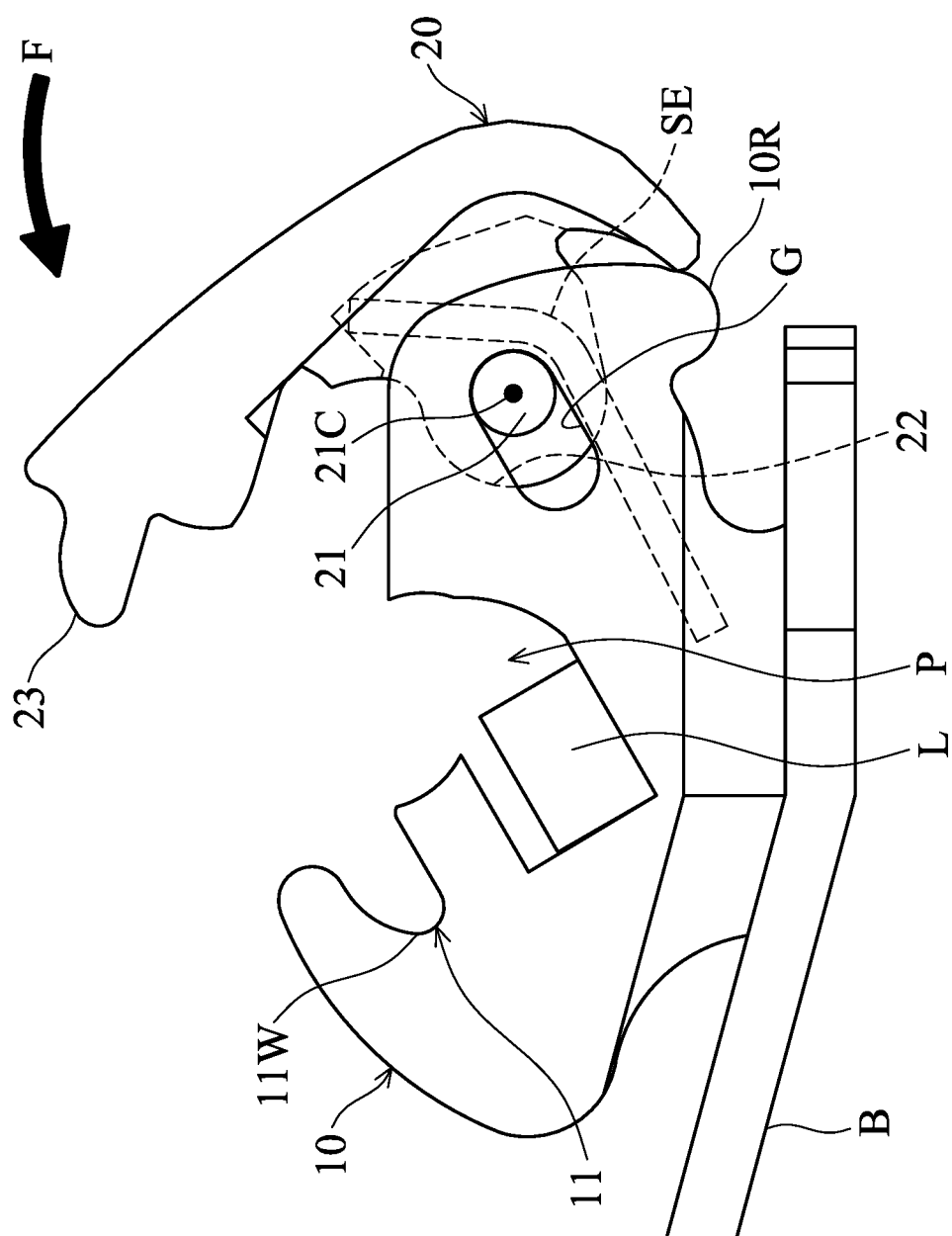
FIG. 5 is a schematic side view of the orthodontic bracket in an open state.

Please refer to FIGS. 1 and 2, wherein FIG. 2 is an exploded view of the orthodontic bracket 100 in FIG. 1. The orthodontic bracket 100 has a main body 10, a cover 20, and an elastic spring element SE. The main body 10 has a base portion B which is configured to be attached or affixed to the teeth. The cover 20 is disposed on and hingedly connected to the main body 10 via a hinge pin 21, and is movable and rotatable relative to the main body 10, so that the orthodontic bracket 100 can be switched between the closed state (FIG. 3) and the open state (FIG. 5).

When the orthodontic bracket 100 is in the closed state (FIG. 3), the cover 20 is at the closed position; and when the orthodontic bracket 100 is in the open state (FIG. 5), the cover 20 is at the open position. The cover 20 is movable between an open position for exposing the archwire slot P of the main body 10 and a closed position for covering the archwire slot P.

Figure 3:
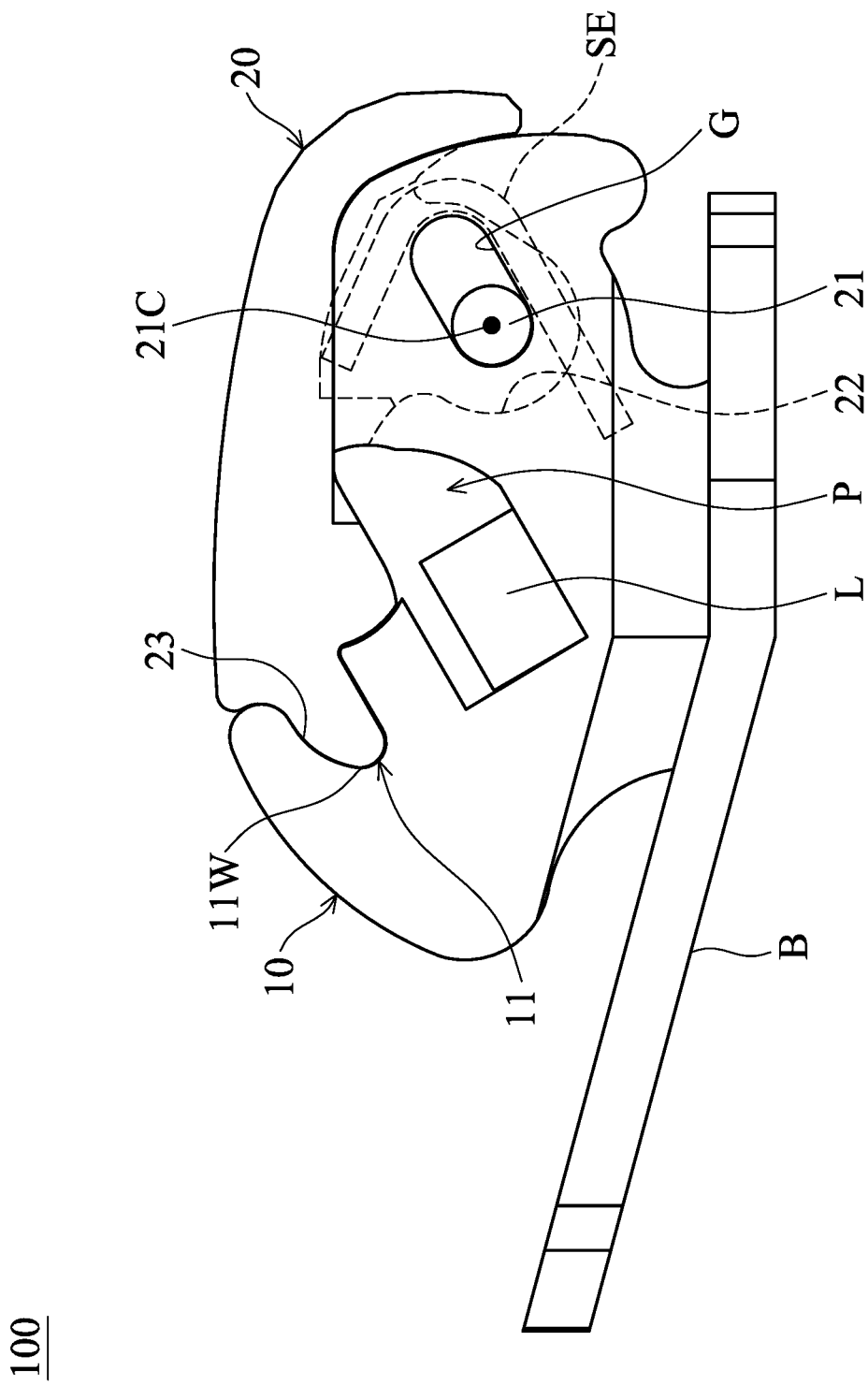
FIG. 3 is a schematic side view of the orthodontic bracket in FIG. 1, wherein the orthodontic bracket is in the closed state.

As shown in FIGS. 2 and 3, the hinge pin 21 is disposed in a hole G of the main body 10, and protrudes from or passes through a connecting portion 22 of the cover 20. As show in FIGS. 3 to 5, the hinge pin 21 is confined within the hole G, wherein the hole G is configured to allow translational movement of the hinge pin 21 along a long axis of the hole G, and allow rotation of the hinge pin 21 about a pin axis 21C of the hinge pin 21.

In this embodiment, the connecting portion 22 fits inside a cavity of the main body 10. When the orthodontic bracket 100 is in the closed state (FIG. 3), the connecting portion 22 overlaps with the hole G, or the hole G is covered by the connecting portion 22, so that a foreign substance can be prevented from entering the inner cavity of the orthodontic bracket 100, to enhance hygiene.

In some embodiments, the body of the cover 20, the hinge pin 21, and the connecting portion 22 can be integrally formed or are in one piece, and the hinge pin 21 is a hinge portion of the cover 20 that is accommodated in the hole G. In some embodiments, the hinge pin 21 may be an independent member, which passes through the connecting portion 22 of the cover 20, and the cover 20 is hingedly connected to the main body 10 via the hinge pin 21. Unlike prior art hinge pins that are flexible and elastically deform when the cover is engaged and disengaged with the main body of the bracket, the hinge pin 21 of the present invention is rigid in structure or is held in a rigid form by the connecting portions 22 of the cover 20.

Referring to FIGS. 2 and 3, the cover 20 has a protrusion 23 in the front end that fits in a recessed slot 11 of the main body 10. Furthermore, the cover 20 has a recess (or opening hole) RE on the top side, which allows an operator to easily manipulate the cover 20 to disengage the protrusion 23 from the recessed slot 11. For example, the operator may use an opening tool to insert in the recess RE and follow the contour of the recess RE to rotate the cover 20 of the bracket 100 while disengaging the protrusion 23 from the recessed slot 11, so that the cover 20 can be disengaged from the main body 10 easily without introducing debonding forces.

The elastic spring element SE is located at one end (first end) of the main body 10 which is opposite to another end (second end) where the recessed slot 11 is located. The elastic spring element SE is located between the main body 10 and the cover 20 and coupled to (contacting or pushing against) the cover 20 and the main body 10, which is configured to generate a force to that moves the cover 20 into the open position. When the elastic force is released, the elastic spring element SE pushes the cover 10 to the open position. In some embodiments, the elastic spring element SE may be a superelastic thin plate made of a Nickel Titanium alloy.

The opening and closing of the cover 20 will be described in detail below.

Figure 4:
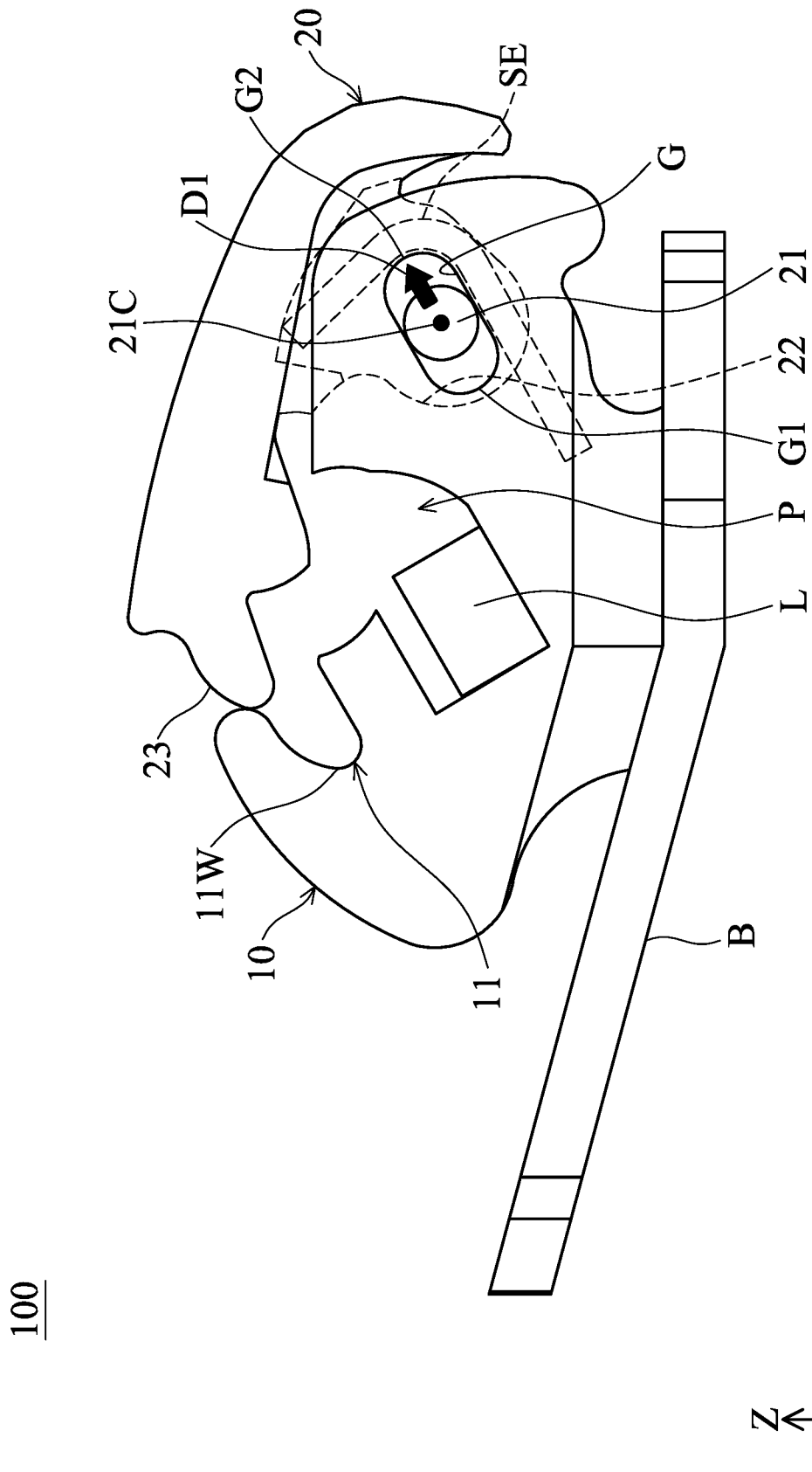
FIG. 4 is a schematic side view of the orthodontic bracket in a disengaged state.

FIGS. 3 to 5 show the orthodontic bracket 100 transitioning from the closed state to the open state, wherein FIG. 3 illustrates the orthodontic bracket 100 in the closed state or the cover 20 in the closed position (or engaged position); FIG. 4 illustrates the cover in the disengaged position; and FIG. 5 illustrates the orthodontic bracket 100 in the open state or the cover 20 in the open position.

When the orthodontic bracket 100 needs to be opened (for example, to install or remove the archwire L), an operator may apply a force to push or slide the cover 20 away from engagement with the main body 10. The cover 20 slides in the translation direction D1 (movement direction) along the long axis of the hole G.

Once the protrusion 23 in the front end of the cover 20 is disengaged from the recessed slot 11 of the main body 10, as shown in FIG. 4, the restoring force of the elastic spring element SE pushes the cover 20 open (FIG. 5), resulting in further translation and rotation of the cover 20 without further action from the operator. This prevents the operator from excessively pulling or pushing on the cover 20 by accident. The stored potential energy in the elastic spring element SE is released to provide the automatic opening action for the cover. In some embodiments, sliding the cover 20 until the hinge pin 21 gets to the half-way position within the hole G is sufficient to release the cover 20 from the engagement with the main body 10.

The elastic force of the elastic spring element SE takes over to automatically push the cover 20 to the open position due to the elastic restoring force, completing the rotation of the cover 20. The translation and rotation may also occur simultaneously, powered by the elastic spring element SE changing from the closed state to the open state. An operator can easily manipulate the cover 20 to disengage the protrusion 23 from the recessed slot 11.

To close the cover 20, an operator can push down on the cover 20, such as applying the force F in FIG. 5, to rotate and slide the cover 20 until the protrusion 23 in the front end of the cover 20 engages with the recessed slot 11 of the main body 10. As the cover 20 is closed, the elastic spring element SE is compressed by the closing cover 20 and elastic potential energy is stored.

In the closed state, the elastic spring element SE is compressed (deformed) and elastic potential energy is stored. The restoring force of the compressed elastic spring element SE acts to rotate the cover 20 open but the cover 20 is blocked by the wall 11W of the recessed slot 11 acting on the protrusion 23 in the front end of the cover 20. The protrusion 23 in the front end of the cover 20 is engaged with the recessed slot 11 of the main body 10 and is pushed against a wall 11W of the recessed slot 11 by this action of the elastic spring element SE. As a result, the engagement of the cover 20 with the main body 10 of the bracket 100 is reinforced.

When the cover 20 moves from the closed position into the open position, the hinge pin 21 moves from a first end G1 to a second end G2 of the hole G (the second end G2 is farther way from the archwire slot P than the first end G1), and the elastic spring element SE tries to return to its original form which pushes against the cover 20 to keep the cover 20 in the open position. With the cover 20 at the open position, the elastic spring element SE prevents the cover 20 from closing again without operator action.

In the open state, the rear portion 10R of the main body 10 is configured to restrict the cover 20. As shown in FIG. 5, the cover 20 is in contact with the rear portion 10R, so that an excessive rotation of the cover 20 can be avoided, and the cover 20 is prevented from opening too far. Another way to restrict the opening of the cover 20 is to shape an inner cavity of the main body 10 so as to limit the movement of the connecting portion 22 of the cover 20 as the cover 20 translates and rotates to the open position.

Figure 6:
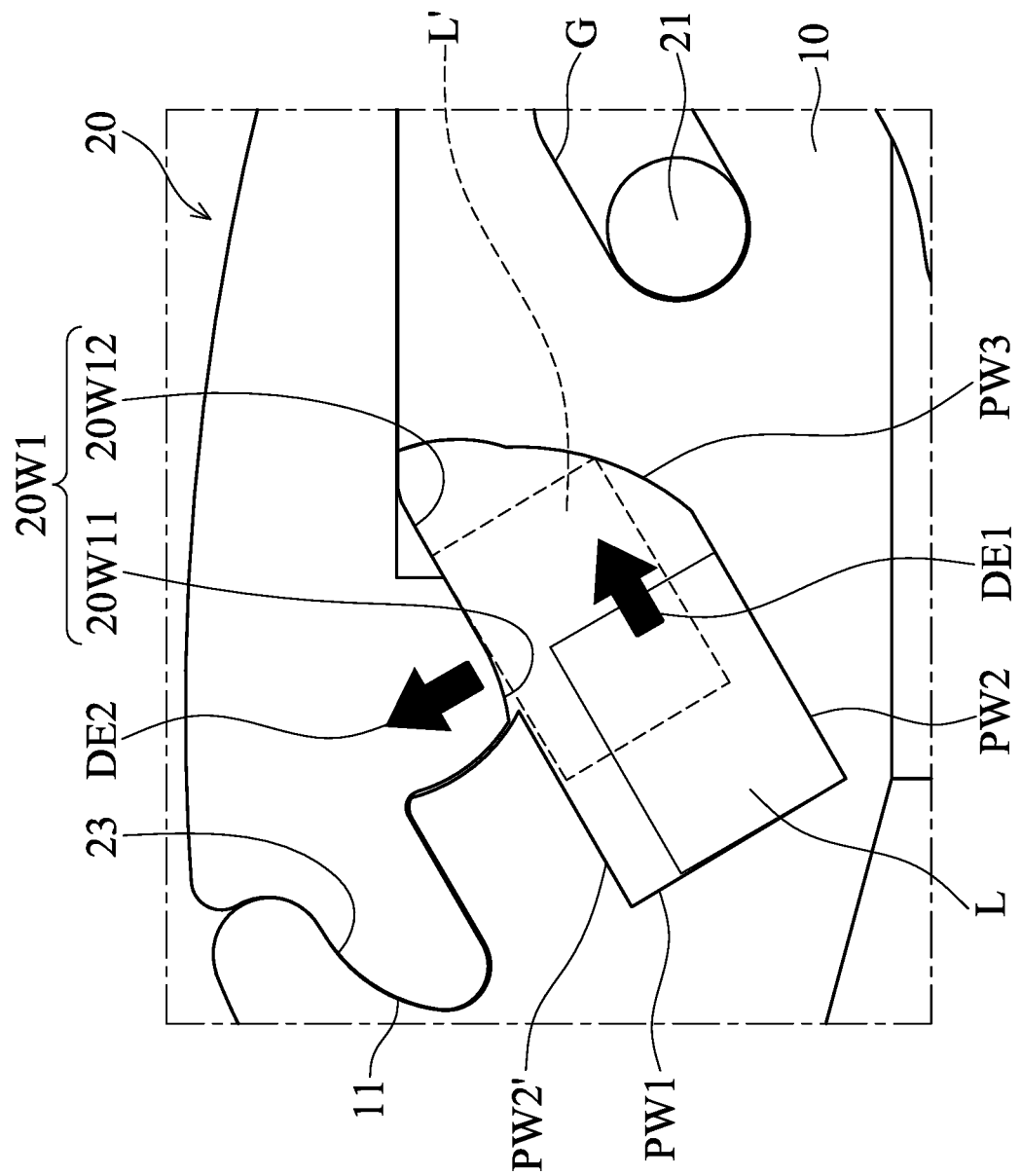
FIG. 6 is a schematic diagram of the archwire being guided by the redirecting wall when a movement of the archwire occurs.

As shown in the FIG. 6, the archwire L is received in the archwire slot P. The archwire slot P has a base wall PW1, a side wall PW2, a side wall PW2', and a redirecting wall W3. In an initial location, the archwire L abuts against the base wall PW1 and the side wall PW2.

During orthodontic treatment, a plurality of orthodontic brackets 100 are bonded to the teeth of a patient, and the archwire L is inserted through those orthodontic brackets 100. The rectangular archwire L may move to push against the walls of the archwire slot P or the cover 20.

In this embodiment, the redirecting wall PW3 and the side wall PW2 are connected to each other. The side wall PW2 extends in the first exit direction DE1, and the redirecting wall PW3 is inclined relative to the first exit direction DE1. In some embodiments, the redirecting wall PW3 is also inclined to the long axis of the hole G. In some embodiments, the long axis of the hole G is parallel to the first exit direction DE1.

When the archwire L moves to the L' position, the side wall PW2 guides the archwire L to move in the first exit direction DE1, and the redirecting wall PW3 guides the archwire L to move from the first exit direction DE1 to the second exit direction DE2 which is different from and not parallel to the first exit direction DE1. Then, the archwire L at the L' position is blocked by the redirecting wall PW3, the side wall PW2', and the cover wall 20W1 of the cover 20. In other cases, the archwire L can also be blocked by the side wall PW2'.

Figure 7:
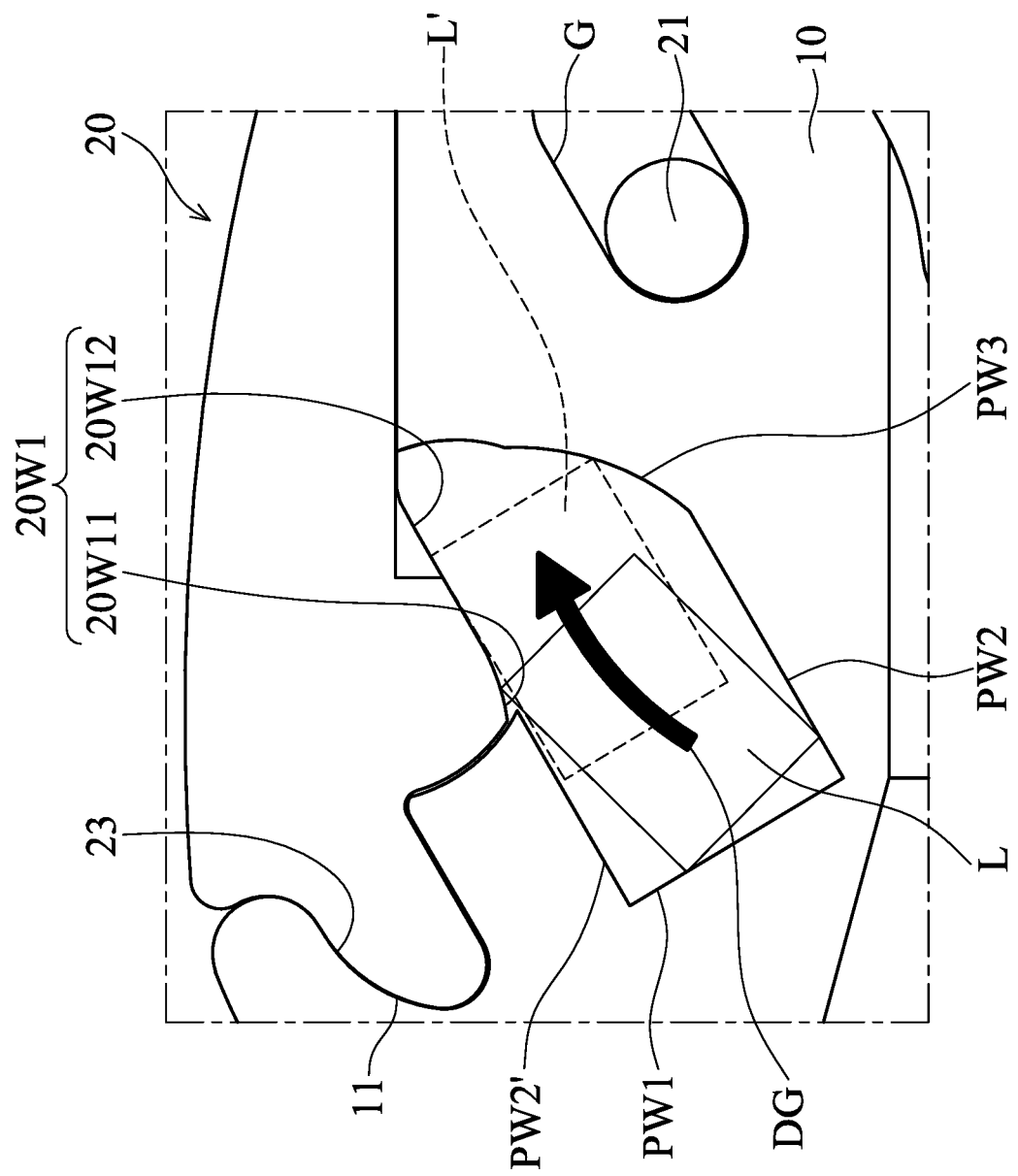
FIG. 7 is a schematic diagram showing another situation of the archwire being guided by the curved portion of the cover wall when a movement of the archwire occurs.

In another situation, when the archwire L moves and tilts to be in contact with the curved portion 20W11 of the cover wall 20W1 as shown in FIG. 7, the curved portion 20W11 guides the archwire L to move along a guiding direction DG toward the redirecting wall PW3, and then the archwire L is blocked by the redirecting wall PW3 and the flat portion 20W12 of the cover wall 20W1 at the position L'.

The pushing force of the archwire L is directed against the redirecting wall PW3, the side wall PW2' and the cover wall 20W1. The force directed against the cover wall 20W1 pushes the protrusion 23 in the front end of the cover 20 against the wall 11W of the recessed slot 11, reinforcing the engagement of the cover 20 with the main body 10. Therefore, the situation of the cover 20 being opened by the movement of the archwire L during orthodontics treatment can be avoided.

When the cover 20 is in the open position (FIG. 5), the archwire L can enter the archwire slot by following the path defined by the redirecting wall PW3 and the side walls PW2 and PW2' of the archwire slot P. Similarly, the archwire L in the archwire slot P can exit by turning away from the redirecting wall PW3.

Figure 8:
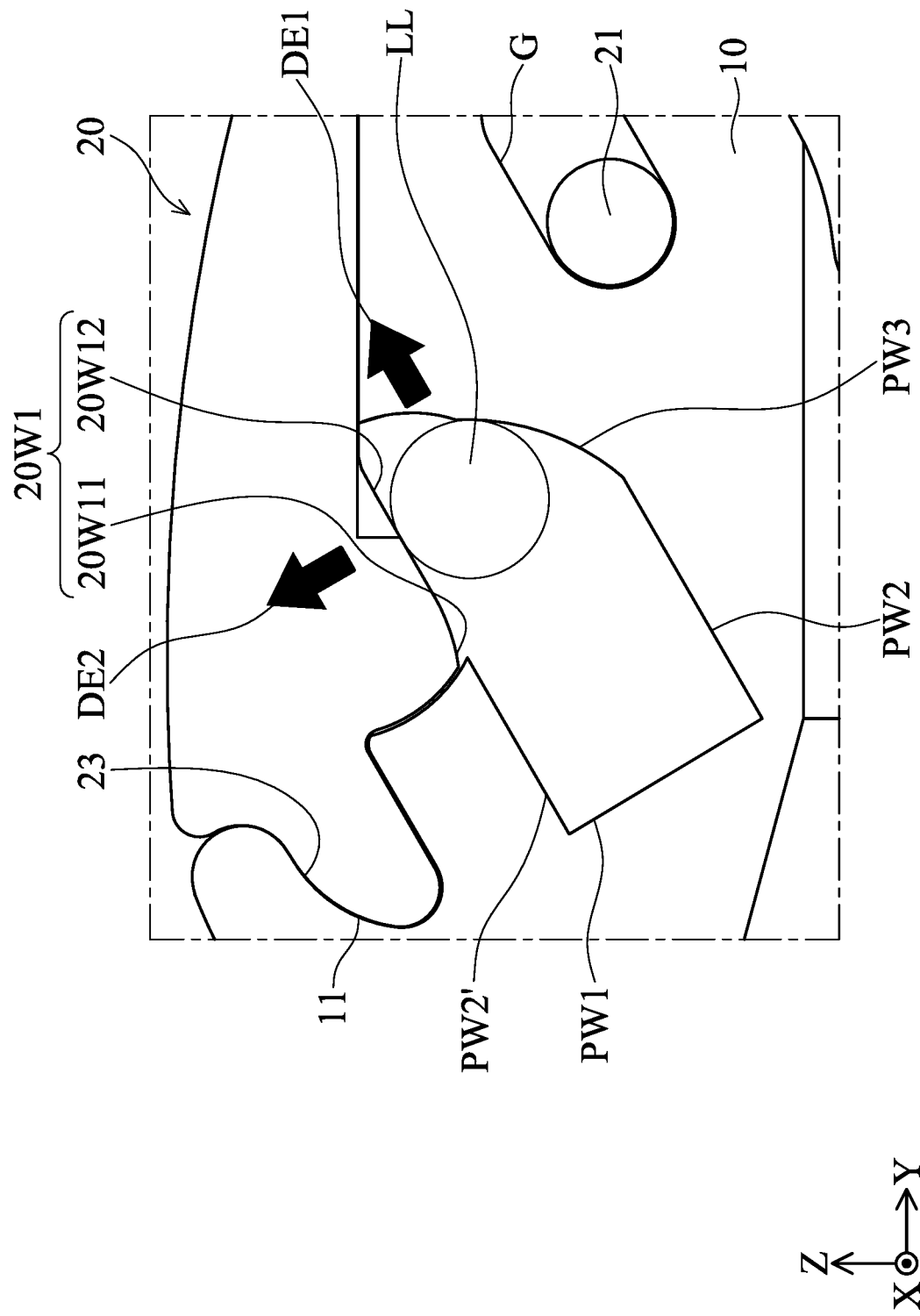
FIG. 8 is a schematic diagram showing another type of archwire, wherein the archwire is blocked by the redirecting wall and the cover wall.

Referring to FIG. 8, a round archwire LL is provided in the orthodontic bracket 100 according to another embodiment. A 0.014 (or any in the range from 0.014 to 0.016) inch diameter round archwire LL is prevented from pushing against the cover 20 in the first exit direction DE1 by the curved redirecting wall PW3 and the flat portion 20W12 of the cover wall 20W1 in the narrowing space between the two walls 20W1 and PW3. The round archwire LL directs a pushing force on the cover 20 in the second exit direction DE2, which acts to reinforce the engagement of the cover 20 with the main body 10.

Figure 9:
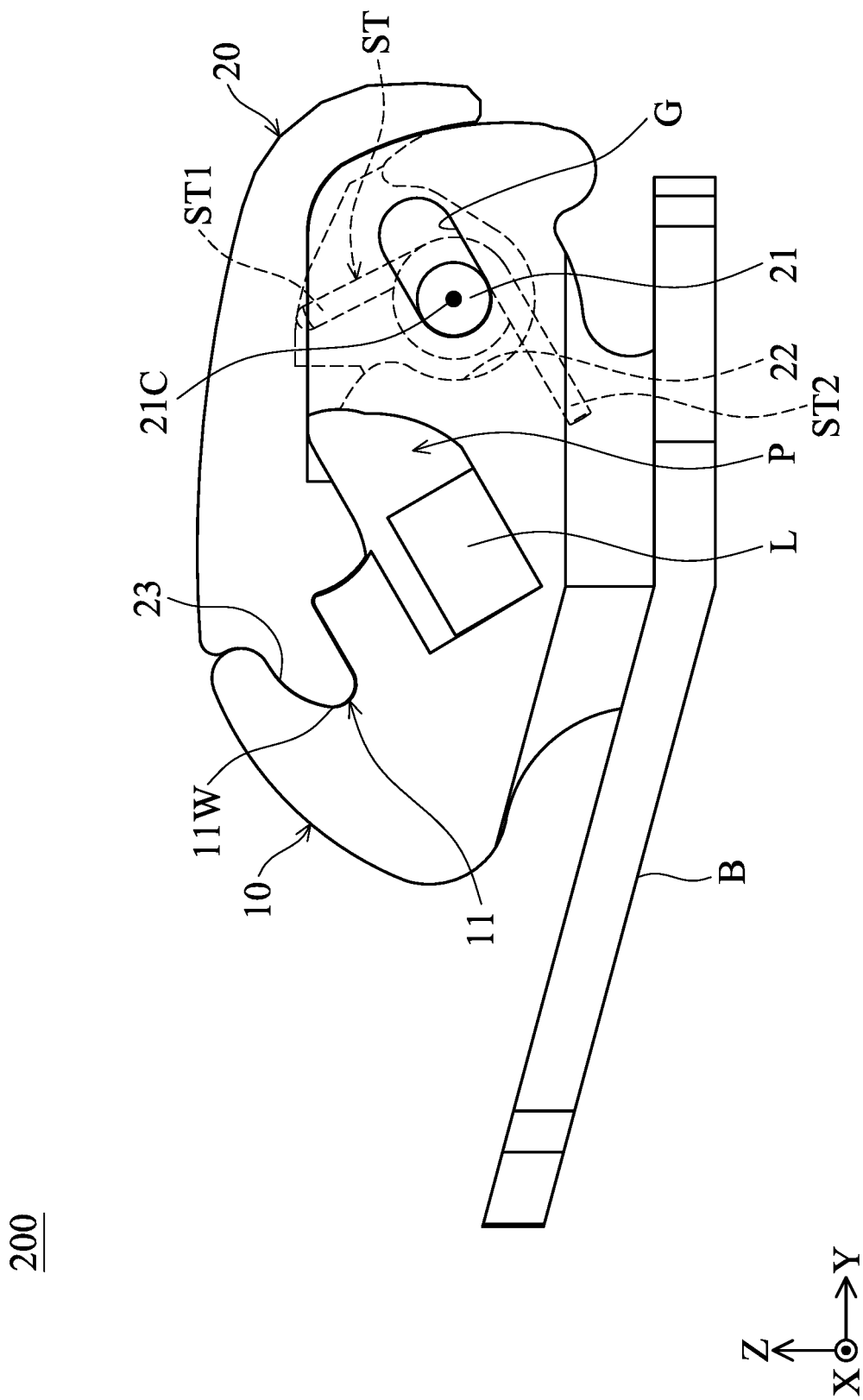
FIG. 9 is a schematic diagram of an orthodontic bracket for dental use according to another embodiment of the present invention.

FIG. 9 shows an orthodontic bracket 200 according to another embodiment of the present invention. The main difference between the orthodontic bracket 200 and the orthodontic bracket 100 (FIGS. 1-2) is that the orthodontic bracket 200 has an elastic spring element ST which is a torsion spring. The torsion spring ST is wrapped around the hinge pin 21. As a result, the torsion spring ST moves together with the cover 20 and the hinge pin 21. The cover extension part ST1 of the torsion spring ST abuts against the cover 20, and the body extension part ST2 of the torsion spring ST pushes against the main body 10.

To close the cover 20, an operator pushes down on the cover 20 in the open position, causing the cover 20 to compress the torsion spring ST. This squeezing action on the torsion spring ST also causes the hinge pin 21 to start a movement to the closed position. Both the main body 10 and the cover 20 have cavities to allow the torsion spring ST to move within the enclosed restricted space during the opening and closing of the cover 20.

Figure 10:
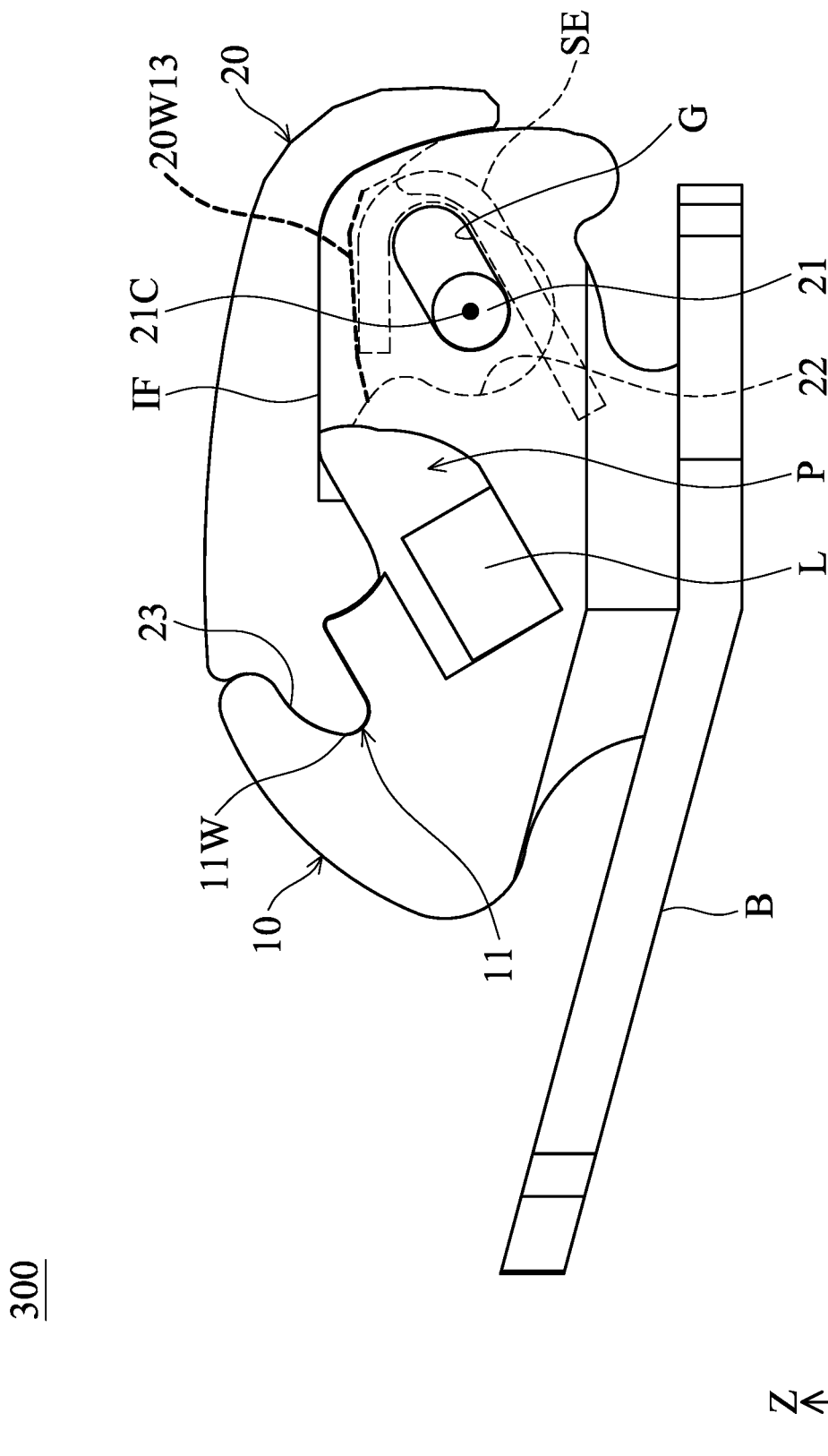
FIG. 10 is a schematic diagram of an orthodontic bracket for dental use according to another embodiment of the present invention.

FIG. 10 shows an orthodontic bracket 300 according to another embodiment of the present invention. The cover 20 has a lower restriction portion 20W13 of the cover wall 20W1, which is configured to restrict the elastic spring element SE. the elastic spring element SE in the closed position is compressed to a greater degree by the cover 20 due the lowered restriction portion 20W13 of the cover's 20 contacting surface (highlighted by the dashed line). By altering the shape of this contacting surface, the elastic spring element SE can be pushed further downward when the cover 20 is in the closed position. In this embodiment, the position of the restriction portion 20W13 is lower than the position of the interface IF between the cover 20 and the main body 10.

Figure 11:
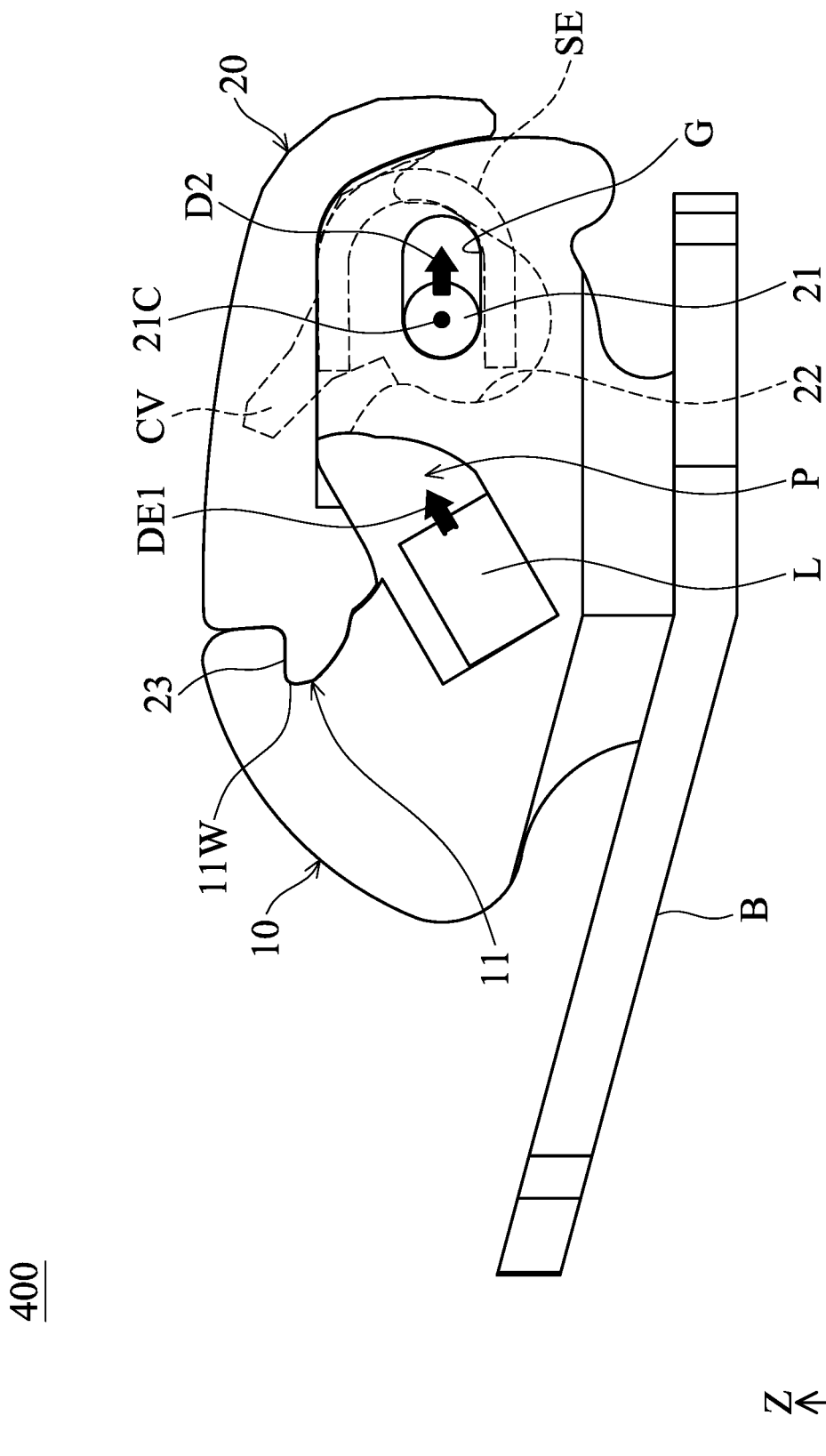
FIG. 11 is a schematic diagram of an orthodontic bracket for dental use according to another embodiment of the present invention.

FIG. 11 shows an orthodontic bracket 400 according to another embodiment of the present invention. The hole G in this embodiment is set at an angle with respect to the first exit direction DE1, such that the long axis of the hole G is in the horizontal direction. In this configuration, the protrusion 23 in the front end of the cover 20 disengages from the recessed slot 11 of the main body 10 when the cover 20 moves along the movement direction D2 with the elastic spring element SE sliding into the inner cavity CV of the cover 20 which extends toward the outer surface of the cover 20. The shape of the protrusion 23 in the front end of the cover 20 and the shape of recessed slot 11 of the main body 10 are different from the two in FIG. 3. In particular, the extending direction of the protrusion 23 is inclined to the first exit direction DE1. The movement direction D2 and the long axis of the hole G are inclined to the first exit direction DE1.

It should be noted that the features of the various embodiments can be combined and used as long as they remain within the scope of the disclosure.

In summary, an embodiment of the present invention provides an orthodontic bracket for dental use, including a main body, a cover, and an elastic spring element. The main body has an archwire slot configured to receive an archwire. The cover is hingedly connected to the main body, and the cover is movable between an open position for exposing the archwire slot and a closed position for covering the archwire slot. The elastic spring element is disposed in the main body, coupled to the cover and the main body, and configured to generate a force to drive movement of the cover to the open position.

An embodiment of the invention provides an orthodontic bracket, including a main body and a cover. The main body has an archwire slot configured to receive an archwire. The cover is hingedly connected to the main body, wherein the cover has a hinge pin confined within a hole of the main body, and the hole is configured to allow translational movement of the hinge pin along a movement direction and allow rotation of the hinge pin about a pin axis of the hinge pin. The archwire slot has a side wall extending along a first exit direction and a redirecting wall inclined to the first exit direction. The redirecting wall is configured to redirect a force from the archwire in a second exit direction different from the first exit direction, so that the cover will not move in the first exit direction caused by the movement of the archwire within the archwire slot.

The embodiments of the present invention have at least one of the following advantages or effects. Due to the elastic spring element and the design of the hinge movement, the cover can be easier to open with minimal action from the operator. Also, a situation of excessively pulling or pushing on the cover by accident can be prevented. With the redirecting wall, a pushing force from the movement of the archwire can be redirected to reinforce the engagement of the cover with the main body of the bracket and prevent inadvertent opening of the cover.

An embodiment of the invention uses a redirecting wall in the slot and a slide-and-rotate hinge movement driven by an elastic element designed to provide cover retention in the closed position. The cover is easy to operate to open and close. The elastic element prevents the cover in the open position from inadvertent closure and the design of the main body prevents the opening cover from over rotation. Also, all external surfaces are even and smooth, and openings are covered to improve patient comfort and hygiene during treatment.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with the true scope of the disclosed embodiments being indicated by the following claims and their equivalents.

What is claimed is:

1. An orthodontic bracket, comprising:
    a main body, having an archwire slot configured to receive an archwire;
    a cover, hingedly connected to the main body, and the cover is movable between an open position for exposing the archwire slot and a closed position for covering the archwire slot; and
    an elastic spring element, disposed in the main body and coupled to the cover and the main body, configured to generate a force to drive movement of the cover into the open position,
    wherein the archwire slot includes a base wall at an end of the archwire slot, a pair of side walls connected to the base wall, and a curved redirecting wall connected to and inclined to one of the pair of side walls, wherein the curved redirecting wall is closer to the cover than the connected side wall, and a surface of the curved redirecting wall facing the other one of the pair of side walls is concave, wherein the pair of side walls is configured to guide the archwire to move in a first exit direction, and the curved redirecting wall is configured to guide the archwire to move from the first exit direction to a second exit direction, wherein the first exit direction is not parallel to the second exit direction.

2. The orthodontic bracket as claimed in claim 1, wherein the main body has a hole, and the cover has a hinge pin confined within the hole, wherein the hole is configured to allow translational movement of the hinge pin along a long axis of the hole, and allow rotation of the hinge pin about a pin axis of the hinge pin.

3. The orthodontic bracket as claimed in claim 2, wherein when the cover moves from the closed position into the open position, the hinge pin moves from a first end of the hole to a second end of the hole which is farther way from the archwire slot than the first end.

4. The orthodontic bracket as claimed in claim 3, wherein the cover further has a protrusion, and the main body further has a recessed slot, wherein when the cover is in the closed position, the protrusion engages with the recessed slot, and the elastic spring element stores elastic potential energy.

5. The orthodontic bracket as claimed in claim 4, wherein the cover being at a disengaged position when the hinge pin is moved along the long axis of the hole from the first end toward the second end of the hole and the protrusion is disengaged from the recessed slot, and the elastic potential energy of the elastic spring element is released to generate the force to rotate the cover from the disengaged position to the open position.

6. The orthodontic bracket as claimed in claim 4, wherein the cover has a cover wall having a curved portion, and the cover wall closes the archwire slot when the cover in the closed position; and
    when the cover is in the closed position, the curved portion guides the archwire to move in a guiding direction toward the curved redirecting wall, and the archwire is blocked by the curved redirecting wall and the cover wall.

7. The orthodontic bracket as claimed in claim 6, wherein the cover wall further has a flat portion connected to the curved portion, and when the curved portion guides the archwire to move in the guiding direction, the archwire is blocked by the curved redirecting wall and the flat portion.

8. The orthodontic bracket as claimed in claim 6, wherein when the cover is in the closed position and a pushing force of the archwire is directed against the curved redirecting wall and the cover wall, the pushing force directed against the cover wall pushes the protrusion against a wall of the recessed slot.

9. The orthodontic bracket as claimed in claim 2, wherein the elastic spring element is a plate spring disposed between the hinge pin and the cover.

10. The orthodontic bracket as claimed in claim 2, wherein the elastic spring element is a torsion spring which is wrapped around the hinge pin.

11. The orthodontic bracket as claimed in claim 2, wherein the cover has a connecting portion connected to the hinge pin, and the hole is covered by the connecting portion when the cover is at the closed position.

12. The orthodontic bracket as claimed in claim 2, wherein the curved redirecting wall is inclined to the long axis of the hole.

13. An orthodontic bracket, comprising:
    a main body, having an archwire slot configured to receive an archwire; and
    a cover, hingedly connected to the main body, wherein the cover has a hinge pin confined within a hole of the main body, and the hole is configured to allow translational movement of the hinge pin along a movement direction and allow rotation of the hinge pin about a pin axis of the hinge pin;
    wherein the archwire slot has:
        a base wall at an end of the archwire slot;

a pair of side walls, connected to the base wall and extending in a first exit direction, wherein the pair of side walls is configured to guide the archwire to move in the first exit direction; and a curved redirecting wall, connected to one of the pair of side walls and inclined to the first exit direction, wherein the curved redirecting wall is closer to the cover than the connected side wall, and a surface of the curved redirecting wall facing the other one of the pair of side walls is concave, wherein the curved redirecting wall is configured to guide the archwire to move from the first exit direction to a second exit direction, the first exit direction is not parallel to the second exit direction, so that the cover will not move in the first exit direction due to the movement of the archwire within the archwire slot.

14. The orthodontic bracket as claimed in claim 13, wherein the main body further has a recessed slot, and the cover further has a protrusion that can be engaged with the recessed slot, wherein the translational movement of the hinge pin along the movement direction enables the engagement and disengagement of the protrusion and the recessed slot.

15. The orthodontic bracket as claimed in claim 13, wherein the archwire slot extends in an extending direction which is perpendicular to the first exit direction and the second exit direction.

16. The orthodontic bracket as claimed in claim 13, wherein the main body has a rear portion, and when the cover in the open position, the rear portion restricts the cover from rotating excessively.

* * * * *